Sept. 30, 1924.  
E. H. HEBERN  
ELECTRIC CODING MACHINE  
Filed March 31, 1921  
1,510,441  
11 Sheets-Sheet 1

INVENTOR  
E.H. HEBERN  
BY Francis M. Wright  
ATT'Y.

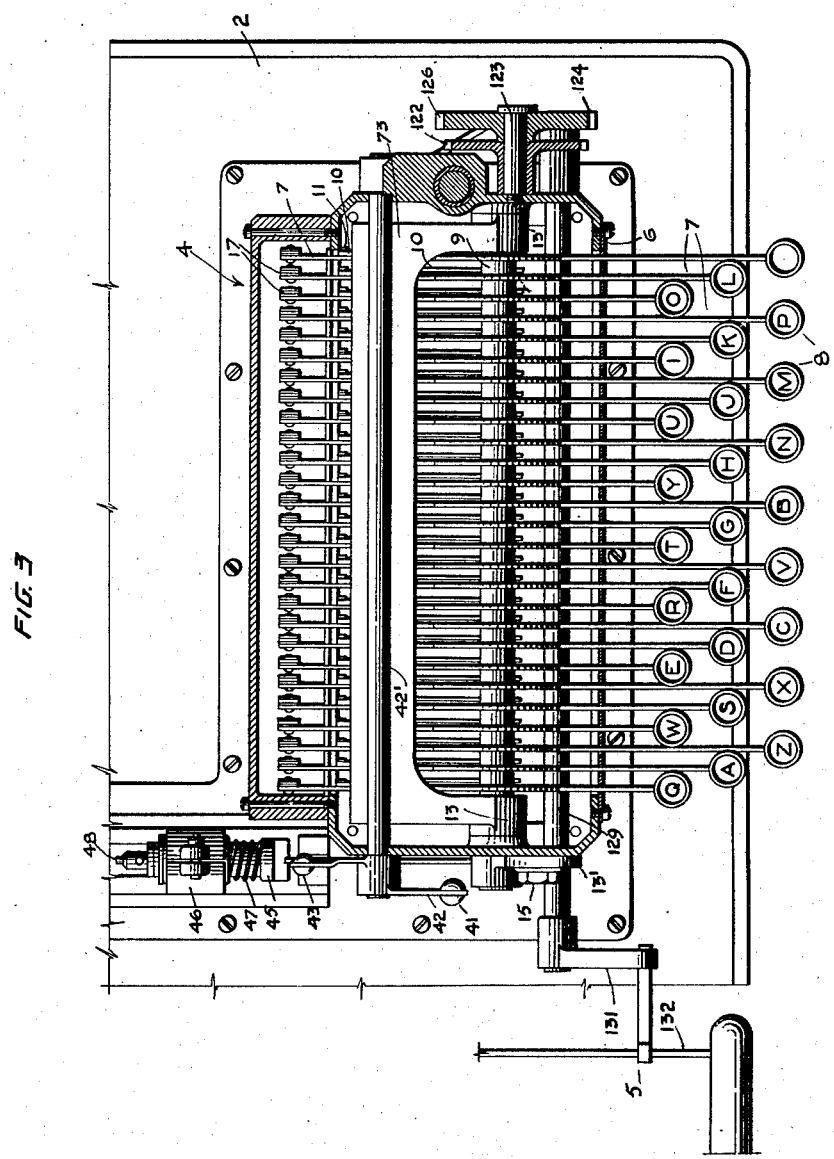

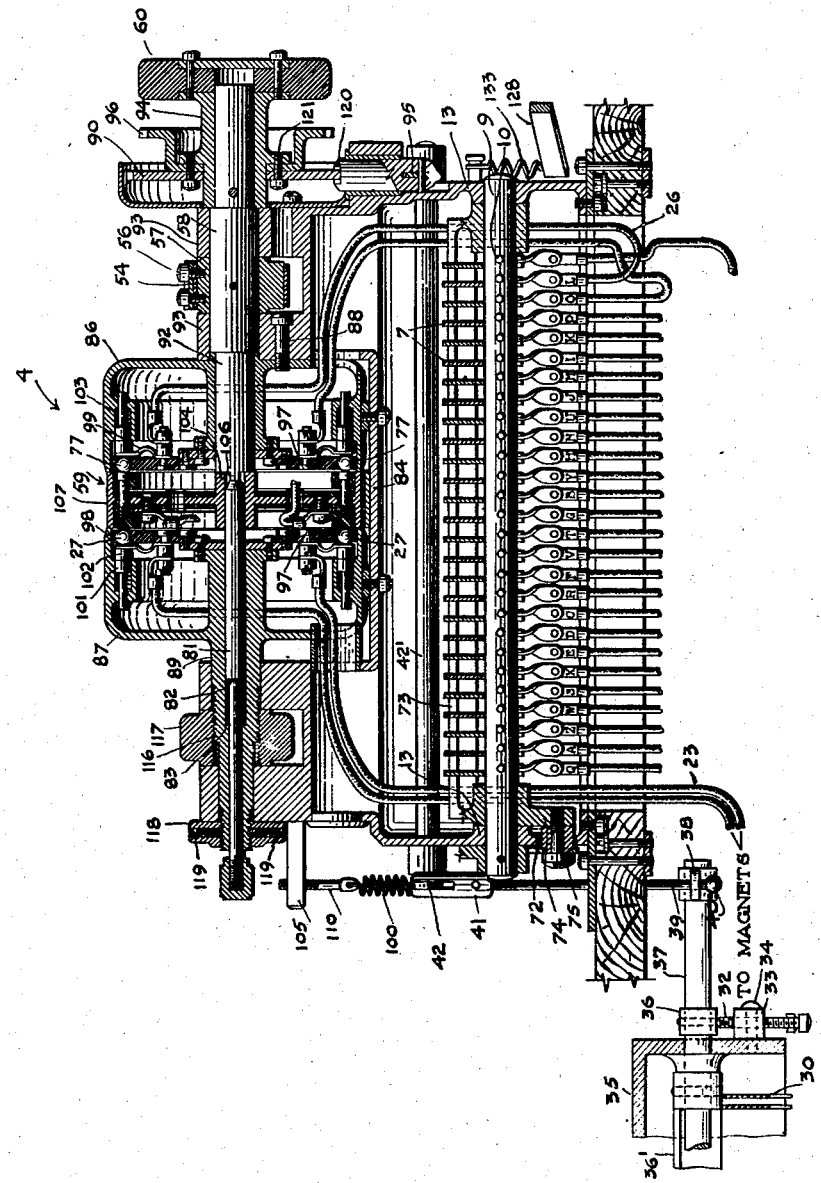

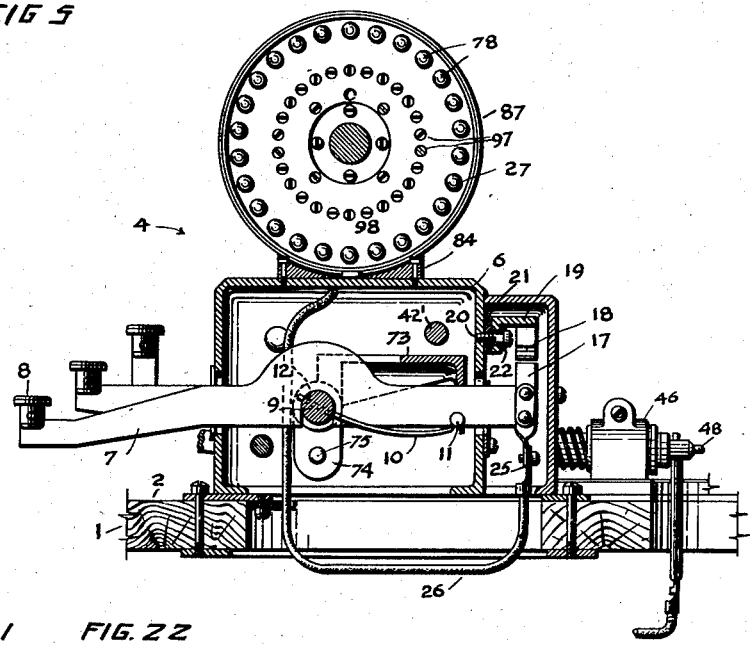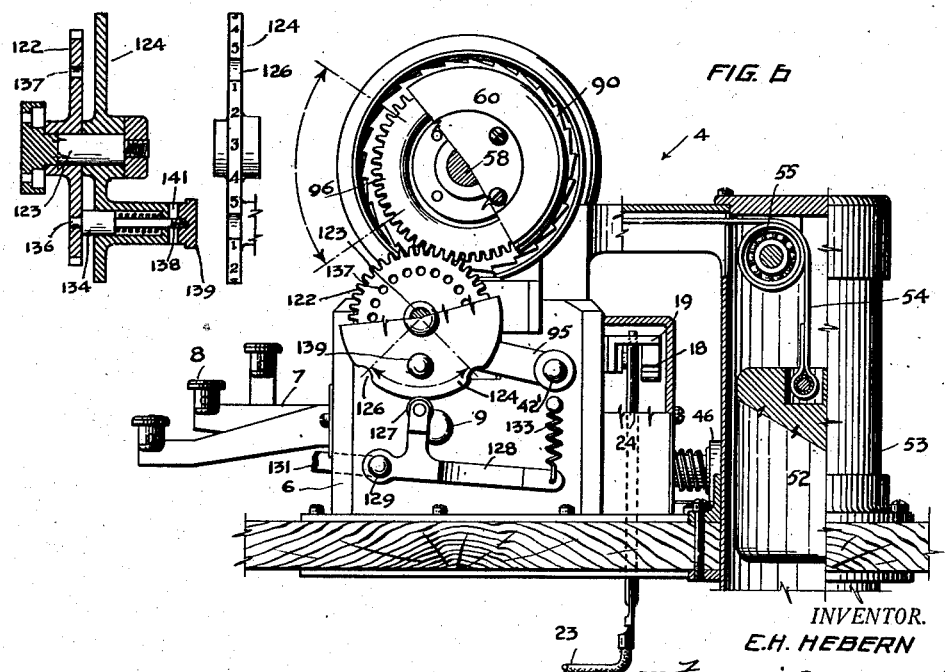

Sept. 30, 1924.

E. H. HEBERN

ELECTRIC CODING MACHINE

Filed March 31, 1921

|  -1-  |  -2-  |  -3-  |
|---|---|---|
| Code sentence | Code word in book | English word to be sent |
| SEND MONEY | TPNI | THE |
| SHIP BY STEAMER | AZXS | ARE |
| STOP IN PARIS | CBZK | CAN |
| PAY DUTY | NHJT | NOW |
| STOP PAYMENT | WHZT | WAS |

THE  ARE  CAN  NOW  WAS  (Message as sent)

INVENTOR.
E.H. HEBERN
BY Francis M. Wright
ATTORNEY

Sept. 30, 1924.

E. H. HEBERN

ELECTRIC CODING MACHINE

Filed March 31, 1921    11 Sheets-Sheet 6

1,510,441

INVENTOR.
E. H. HEBERN
BY Francis M. Wright
ATTORNEY

Sept. 30, 1924.
E. H. HEBERN
ELECTRIC CODING MACHINE
Filed March 31, 1921     11 Sheets-Sheet 7
1,510,441
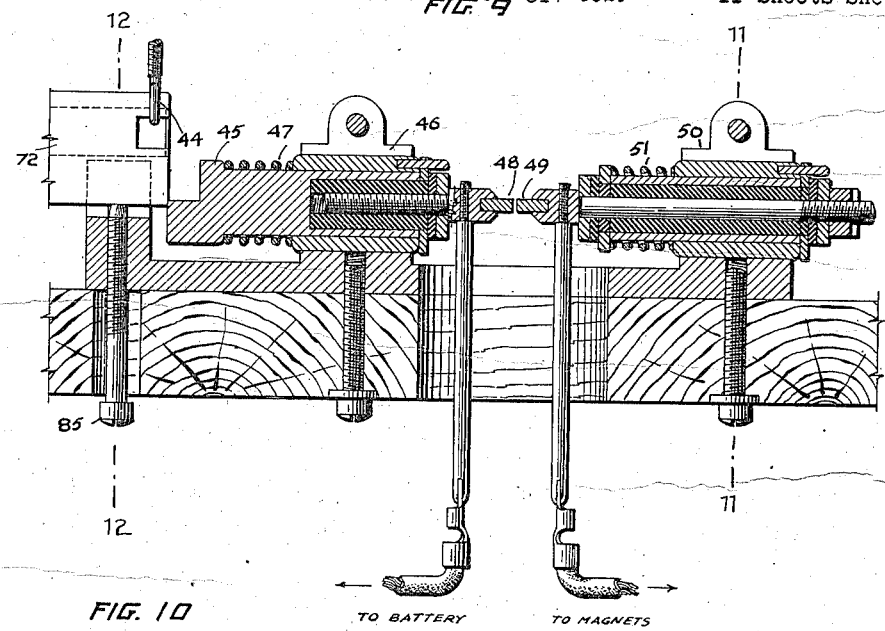
FIG. 9
FIG. 10
TO BATTERY    TO MAGNETS
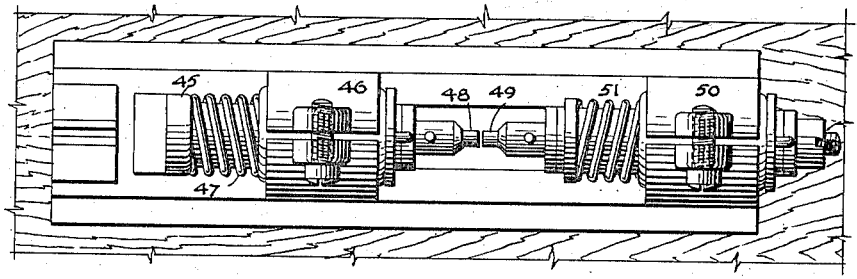
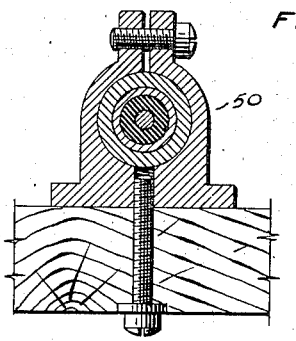
FIG. 11
FIG. 12
INVENTOR
E.H. HEBERN
BY Francis M. Wright
ATTORNEY Sept. 30, 1924.
E. H. HEBERN
ELECTRIC CODING MACHINE
Filed March 31, 1921.
1,510,441
11 Sheets-Sheet 8
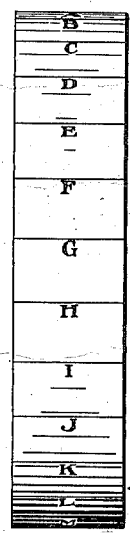
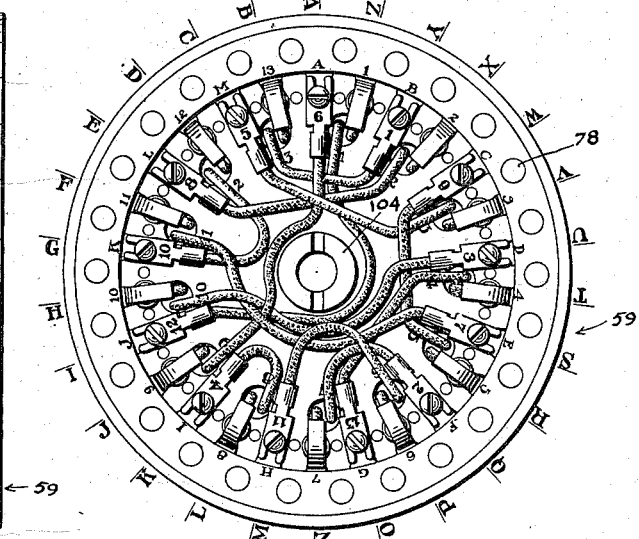
FIG. 13
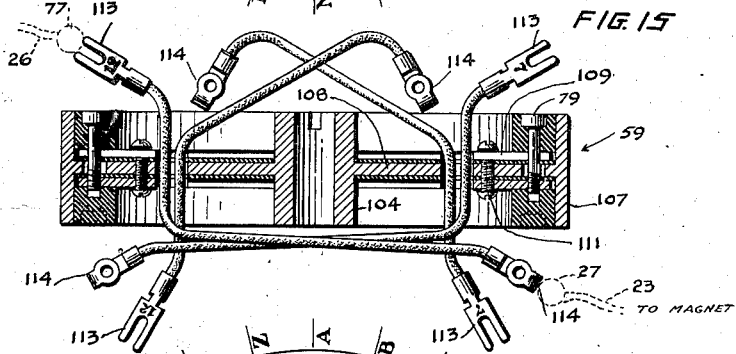
FIG. 14 FIG. 15
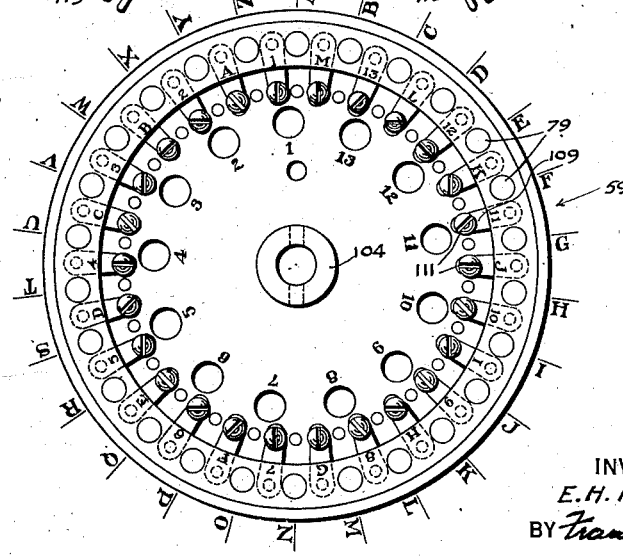
FIG. 16
INVENTOR
E. H. HEBERN
BY Francis H. Wright
ATTORNEY Sept. 30, 1924.
E. H. HEBERN
ELECTRIC CODING MACHINE
Filed March 31, 1921   11 Sheets-Sheet 9
1,510,441
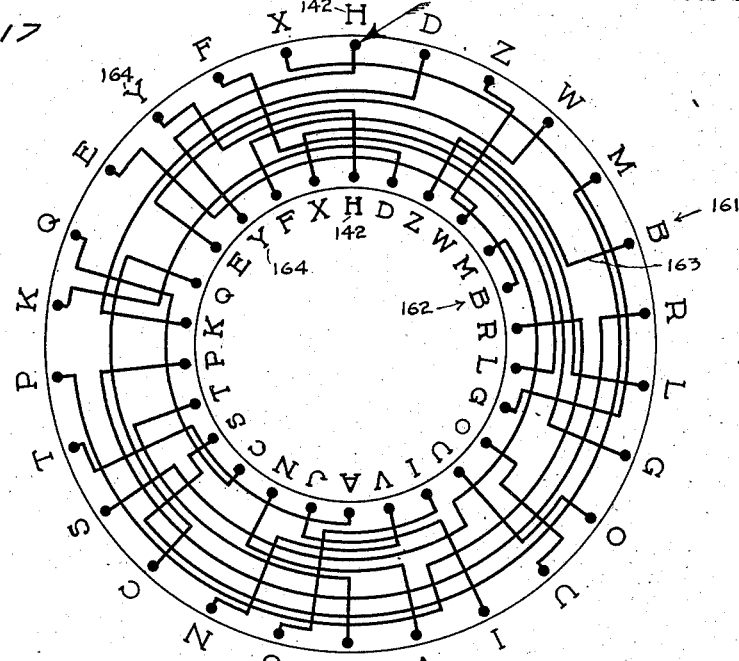
FIG. 17
FIG. 23
```
142 ——H H H H H H H H H H H H H H H H H H H H H H H H H H
164 ——Y O O W L Q L A Q A B Y Y B W W X D S S A Y A P W P
       165 166
```
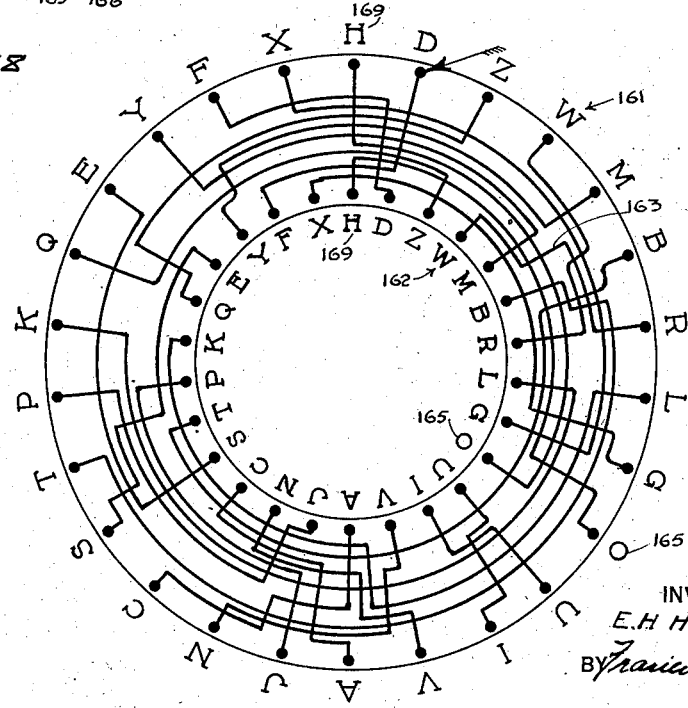
FIG. 18
INVENTOR
E. H. HEBERN
BY Francis W. Wright
ATTORNEY Sept. 30, 1924.

E. H. HEBERN 1,510,441

ELECTRIC CODING MACHINE

Filed March 31, 1921

INVENTOR.
E.H. HEBERN
BY Francis M. Wright
ATTORNEY

Sept. 30, 1924.

E. H. HEBERN

ELECTRIC CODING MACHINE

Filed March 31, 1921    11 Sheets-Sheet 11

INVENTOR.
E.H. HEBERN
BY Francis M. Wright
ATTORNEY

Patented Sept. 30, 1924.

1,510,441

UNITED STATES PATENT OFFICE.

EDWARD H. HEBERN, OF OAKLAND, CALIFORNIA, ASSIGNOR TO H. & H. PATENT DEVELOPING COMPANY, OF OAKLAND, CALIFORNIA.

ELECTRIC CODING MACHINE.

Application filed March 31, 1921. Serial No. 457,419.

*To all whom it may concern:*

Be it known that I, EDWARD H. HEBERN, a citizen of the United States, residing at Oakland, in the county of Alameda and State of California, have invented new and useful Improvements in Electric Coding Machines, of which the following is a specification.

The present invention relates to an improved attachment to typewriting machines of that character in which there are provided finger keys which electro-magnetically operate the type bars of the typewriting machine.

One object of the invention is to provide such an attachment which will enable the key levers to be operated more rapidly and with greater uniformity of strength than heretofore.

A further object is to provide an attachment of this character which will permit the regular typewriting keys to be actuated by the fingers in the same manner as if the attachment were not attached to the typewriting machine.

A further object is to provide means whereby such an attachment can be used to operate a typewriting machine or machine at a distant point.

A further object is to provide such an attachment which can be used advantageously in connection with a cipher machine for writing in cipher by operating the keys of the attachment.

A further object is to provide a cipher system which will be reversible, that is, such that the original and cipher letters are in pairs of complementary letters, either letter of each pair serving as the cipher of the other letter.

A further object is to provide a cipher machine in which the cipher code will be changed every time a letter is written, and will still be reversible.

A further object is to provide, in a cipher machine, means for changing instantaneously a master code, that is, one from which the other codes are obtained as last above stated.

A further object is to provide a changeable hand code device that can be readily carried concealed upon the person.

In the accompanying drawings:

Figure 3 is a plan view of my improved electric attachment for typewriting machines, the latter not being shown.

Figure 4 is a broken longitudinal sectional view thereof, parts being shown in side elevation.

Figure 5 is a transverse sectional view thereof.

Figure 6 is a broken end view thereof.

Figure 7 is a broken end view thereof taken from the other end to that which Figure 6 is taken.

Figure 9 is a vertical sectional view thereof showing the automatic regulator.

Figure 10 is a plan view of the same.

Figures 11 and 12 are vertical sections on the lines 11—11 and 12—12 of Figure 9.

Figure 13 is a side elevation of a code wheel.

Figure 14 is an edge view thereof.

Figure 15 is a diametrical setctional view thereof.

Figure 16 is a view similar to Figure 13 but showing the other side of the wheel.

Figure 17 is a diagram showing the wires of the code wheel in relation to the wires that operate the type bar of the magnet and also in relation to the contacts that are operated by the key shown of the code machine.

Figure 18 is a similar view showing these keys when the code wheel has been turned through one space.

Figure 19:
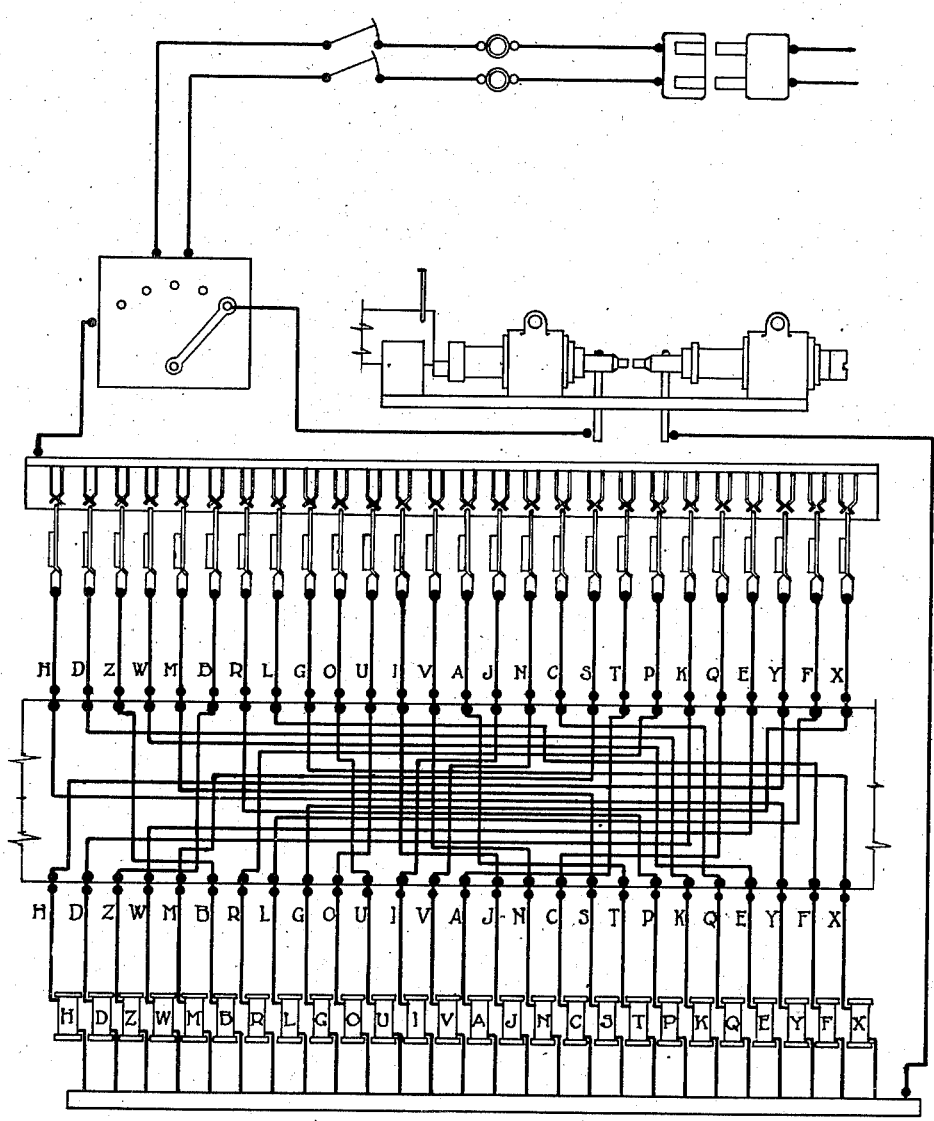

Figure 19 is a diagram of the wiring of the twenty-six code machine.

Figure 20:
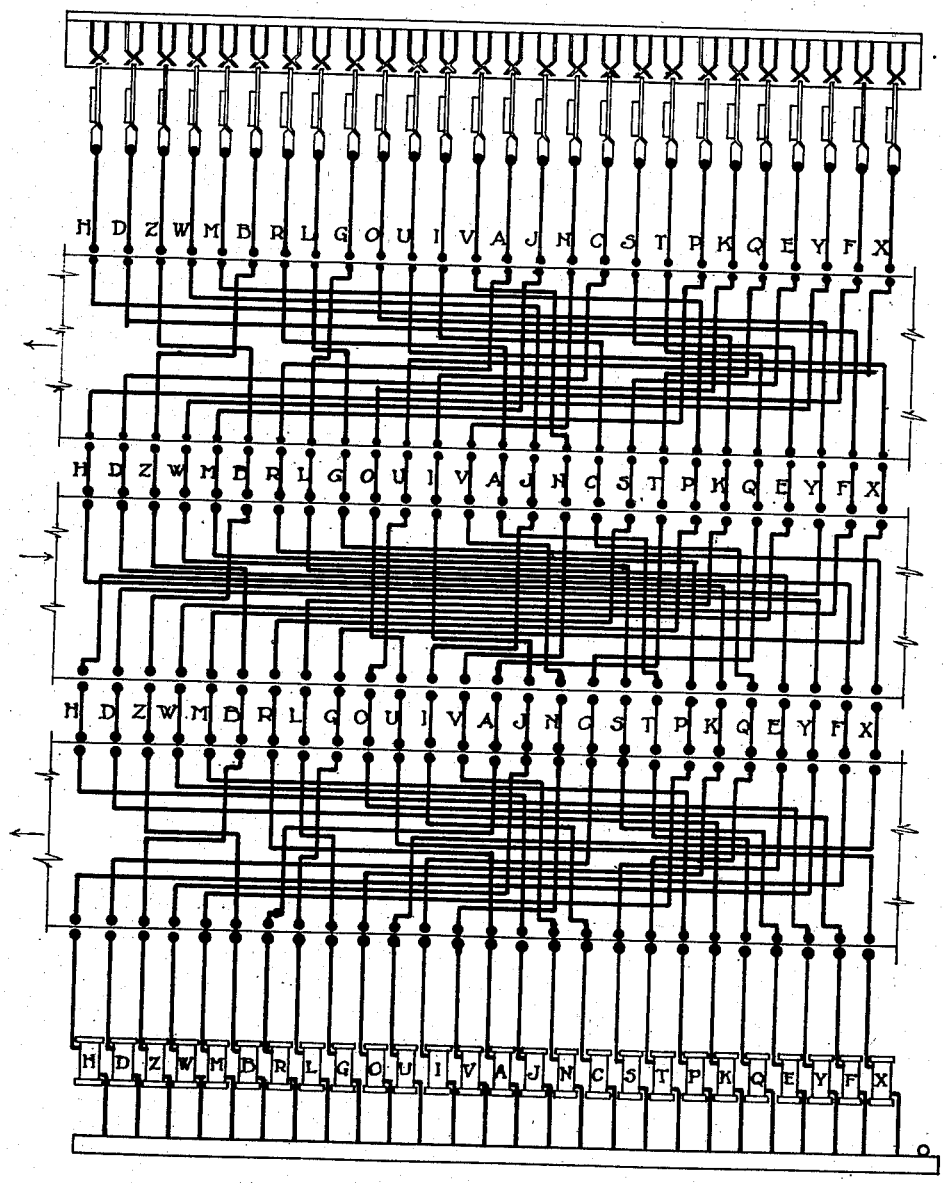

Figure 20 is a diagram of the wiring of a six-hundred and seventy-six code machine.

Figure 21 is an axial section of the automatic spacing attachment.

Figure 22 is an edge view thereof.

Figure 23 illustrates the translation of a letter of the typewriting machine into different letters of the code by successive operations of the letter.

Figure 24:
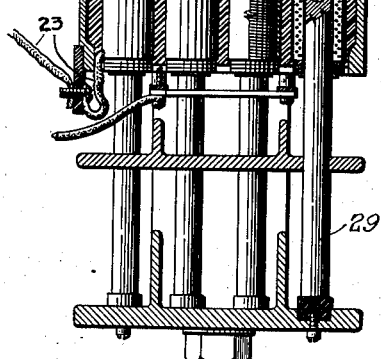
Figure 8:
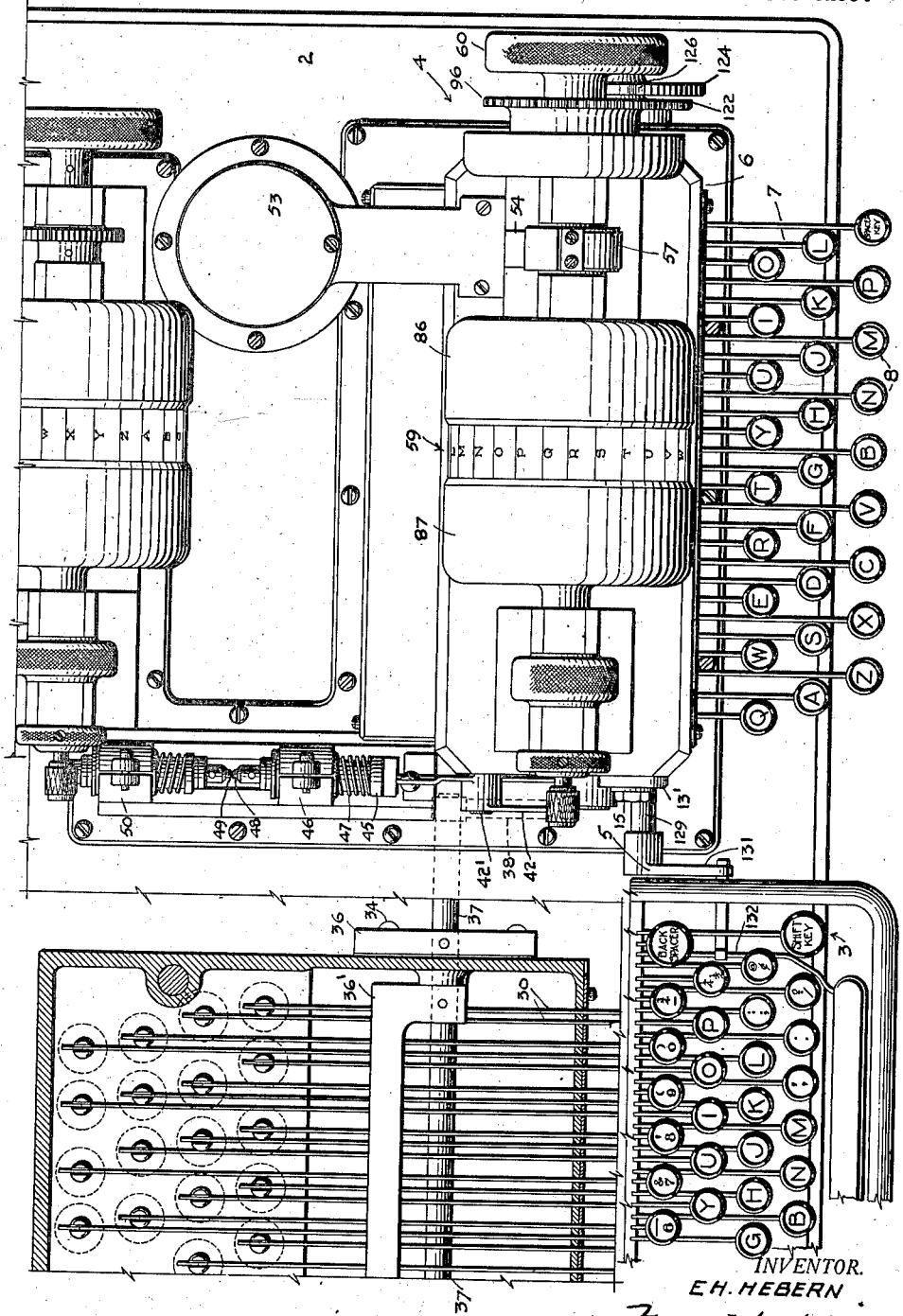
Figure 8 is a plan thereof showing also in section a part of the typewriting machine to which it is attached.

Figure 24 illustrates the manner of using the machine to economize in sending messages.

Referring to the drawings: 1 designates a table of my improved machine on the top 2 of which is supported a typewriting machine 3 here shown as a Remington #10 typewriting machine, together with the coding machine 4 operatively connected with the typewriting machine as shown at 5. Any other form of typewriting machine may be used with possibly slight changes in the construction of the connections. On the frame 6 of the coding machine are operatively supported key levers 7 having finger keys 8 attached thereto designated by letters on a fortuitous plan. The key levers 7 are all pivoted on a common shaft 9 extending longitudinally of the coding machine. Their front ends are normally raised by means of springs 10 the rear ends of which are bent around rivets 11 extending from the key levers while the front ends extend through holes 12 in the shaft 9. Said shaft extends through bearings 13 in the sides of the frame of the coding machine and on the outer side at one end carries an arm 13', the other end of which is slotted as shown at 14. Through said slot extends the screw 15 which is screwed into the adjacent end of the frame of the coding machine. By turning said shaft by means of said arm 13' it can be adjusted to vary the extent of throw of said spring 10.

Upon depressing any one of the keys 8 the corresponding key lever is turned upon the shaft 9 its rear end moving upwardly thereby causing a contact 17 carried by said rear end to contact with a contact 18 carried by an angle bar 19 secured by screw 20 to the frame 6 of the code attachment but insulated from said frame by a strip of insulating material 21 and additional insulation 22 around the screw. An electric current from any suitable source preferably the city supply is led to the angle bar 19 by means of a wire 23 which is connected at one end to the source of supply and at the other end to a rod 24 screwed into the angle bar 19.

From the angle bar 19 the current passes to the contact 18 which is connected to the bar 19 and on depression of one of the keys 8 as above described, the current can pass from the contact 18 to the contact 17 on the rear end of the depressed key whence it is led by the corresponding covered wire 26, connected to the contact 17 by the terminal 25 to one of a circular series of balls 77 in the code wheel 59 hereinafter described.

After passing through the code wheel 59 in the manner hereinafter described, the current is led by one of the wires 23 to one of the electro-magnets 28, Figure 7, that operate the typewriting machine.

This operation is effected as follows:

The electro-magnet energized by the current which has been led to it through the depression of the key of the coding machine causes a core 29ᵃ with which it is provided to move upwards thus operating a lever 30 to one of which said core is connected the other end being attached to a hook 31 which engages a key lever of the typewriting machine, the rocking of the lever 30 by the action of the solenoid therefore causing the corresponding key lever of the typewriting machine to be operated and a letter to be printed, this letter being the cipher letter corresponding to the letter of the key of the coding machine which has been depressed.

Before the type strikes the bar of the typewriting machine, however, the current is cut off in the following manner. A brass rod 29 attached to the core of the solenoid which is actuated is raised through said solenoid and, after being raised a short distance pushes up a lever 30 attached to the hook which engages in a finger key of the typewriting machine and rocks the same in its movement. The upper end of a screw 32 is screwed through a bar 33, fastened by screw 34 to the casing 35 of the typewriting machine. The screw 32 is adjustable against a rocker bar 36 mounted fast to the shaft 37 which at its end carries on arm 38 through which passes a rod 39 having at its lower end a ball-like extension 40 and at its upper end screwed into a socket in the lower end of a hanger 41 depending from one arm of a lever 42 secured to a shaft 42' on the frame of the coding machine. From the outer end of the other arm depends a hanger 43 having a reduced extension 44 engaging a finger plate 72 which is engaged by the end of a plunger 45 slidable in a bearing 46 and normally pressed forward by a spring 47.

The rear end of the plunger 45 is provided with an insulated platinum contact 48 adapted to engage with a contact 49 on a rod slidable through the bearing 50 and pressed forward by a coil spring 51. The upward movement of the core of the solenoid 29 causes the key lever 30 to strike and raise the yoke 36' which causes a quick downward pull of the upper rocker arm 42 pivoted to the shaft 42' thereby raising the rearward end of said arm causing the push plate 72 to be raised instantly allowing the platinum contact points 48 and 49 to open by means of the spring 47. By the same movement of the upper rocker arm 42 Figure 7, the dog 120 on the arm 95 pivoted on said shaft 42' Figure 4, is instantly withdrawn from the ratchet wheel 90 thus allowing the ratchet wheel to advance one step. By suitably adjusting the screw 32 the current can be cut off at any position of the core of the magnet. In order to change the code in the printing of each letter there is provided a weight 52 which can descend in a well 53 attached to the machine and is attached to a belt 54 which is fastened around the ball bearing pulley 55 and is attached at its front end by a screw 56 to a pulley 57 which is fastened to a shaft 58 one end of which is inserted in the slot at the center of the wheel 59 while the other end passes through a hub 94 and fits into the center of the hand wheel 60. The ratchet wheel 90 is made fast to the hub 94 by screws 121 and is provided with twenty-six teeth, while the dog 120 carried on the end of the arm 95 mounted on the shaft 42' is normally raised into engagement with the ratchet wheel by a spring 100 made adjustable by the screw 110 screwed to the bar 105 attached to the frame of the machine, at the end opposite to the arm 95. It follows from this construction that the same operation which opens the circuit through the electromagnet also actuates the dog 120 of the ratchet wheel.

Secured to the hub 94 by the same screws 121 which secure the ratchet wheel 90 thereto is a gear wheel of fifty-two teeth 96 which meshes with the gear wheel of forty teeth 122 mounted upon a lug 123 extending out from the frame of the machine 1. Upon movement of the ratchet wheel five spaces the gear wheel of fifty-two teeth passes over ten teeth thereby turning the gear wheel of forty teeth into which it meshes one-fourth of a turn; mounted upon the same shaft as the wheel 122 is a cam wheel 124. Fulcrumed on the shaft 9 is the member 73 extending rearwardly therefrom, the rearward portion resting upon all of the keys so that if any key is depressed said rearward portion is raised and the downward arm 74 of the bar will move rearwardly. Connected to the arm 74 by the screw 75 is the plate 72, which is normally drawn downwards by means of a spring 80 against the adjusting screw 85, Figure 9.

The depression of the key therefore pushes the plate 72 rearwardly and as the end of this plate abuts the end of the plunger 45 the plunger is also forced rearwardly against the spring 47 bringing the platinum points 48 and 49 into contact. As the depression of the key also closes a contact 17, 18 the corresponding electro-magnet is at once brought into operation causing one of the typewriter levers to be actuated and the plate 72 to be raised as previously described, whereupon the contacts 48 and 49 separate under the action of the spring 47 thereby breaking the circuit.

Immediately the current ceases, the core 29ª of the electro-magnet returns to its normal position and the lever 42 is drawn upwardly by the spring 100, releasing the upward pull of the hook 44 on the lever 72.

When the pressure on the key 8 of the coding machine that has been depressed is released the member 72 drops downward by its own weight moving the arm 74 and thereby the plate 72 rearwardly the extent of the movement being so adjusted that the end of the plate 72 clears the plunger 45 permitting the plate to be drawn down by the spring 80 into its previous position adjacent the plunger in readiness for the operation of the next key.

The plate 72 and plunger 45 are both of hardened steel to avoid wear by constant use. The action which has just been described instantly releases the dog 120 of the ratchet wheel 90 and the pulling of the weight 52 against the ratchet wheel causes it to advance one step, thereby changing the code at each operation of the key. The advantage of the use of the regulator is that thereby the current through the key contacts 17 and 18 is turned on after the contact is made and is cut off before said key contacts are released, also the current passing through the circular series of electric contacts 27 and 77 bearing against the contacts 78 and 79 of the code wheel is cut off before the action of the dog 120 of the ratchet wheel allows the code wheel 59 to be moved by the action of the weight, thus preventing any sparking in the movement of the code wheel and lengthening indefinitely the life of the apparatus, thus showing that there is only one electric contact 48 and 49 in the whole machine which would require the use of platinum points. For the purpose of rendering the machine capable of being used with different codes, the code wheel 59 is removable from the machine and interchangeable with other code wheels or can itself be changed to make a different code, a detailed description of the code is shown in the diagrams Figures 17 and 18. To remove the code wheel from a machine the shaft 81 Figure 4 can be drawn to the left until a shoulder 82 thereon abuts against a shoulder 83 in the bearing for the said shaft, whereupon the inner end of the shaft has been withdrawn until outside the code wheel. The code wheel then drops slightly and rests upon a pillow 84 centrally secured to the frame of the machine and can be lifted out from between two shells 86 and 87 of which the right hand shell 86 is fixedly secured by a screw 88 to the frame of the machine, whereas the left hand shell 87 is formed integral with the bearing 89 of the shaft 81. The right hand shell 86 is supported on the reduced portion 92 of the shaft 58 of which the middle portion is enlarged and rotates in bearings 93 formed on the frame of the machine, the outer portion carrying keyed thereto the hub 94 having attached thereto the ratchet wheel 90 and the gear wheel 96 as previously described. The right hand shell 86 is provided with a register mark 86ª for use in setting the code wheel in the required position when commencing to code or decode a word. In this shell 86, a series of twenty-six covered wires 26, attached at their lower ends to the rear ends of the contacts 17 on the key levers 7, are, through the code wheel 59 and a series of twenty-six covered wires 23, in the left hand shell 87, connected with the electro-magnets 28 of the typewriting machine.

The wires of each series are connected to lugs 97 imbedded in a rubber insulating disk 98 with which each shell is provided, spring conductors 99 from the lugs 97 bearing against the rear sides of the balls 27, 77 which are located in holes or chambers in the disks 98. The diameter of the balls 27, 77 is slightly greater than the thickness of the disk and the diameter of the holes or chambers is slightly greater than that of the balls whereby the latter while being retained in the chambers project slightly therefrom on both sides of the disk and also keep rolling freely therein as the code wheel rotates thereby being kept bright.

Since electricity passing through a light spring tends to crystallize it and thereby render it inoperative, additional means are provided to ensure that each conductor 99 is kept in contact with its respective ball 27 or 77. Each spring carries a block of insulating material 102 against which a plunger 101 rests. Carried on the end of each plunger is a spring 103 which forces it forward against the insulating block 102 thereby keeping the conductor 99 in contact with its respective ball. The spring 103 by this arrangement is insulated from the current carrying parts and no electricity therefore passes through.

A precisely similar arrangement is adopted for each of the shells. The code wheel 59, marked with the letters of the alphabet around its periphery which is intermediate between the shells comprises a hub 104 freely revoluble on the shaft 81 but keyed as shown at 106 to the shaft 58 and a peripheral portion 107 connected with the hub 104 by a circular portion 108 the insulated peripheral portion of which is enlarged or thickened to occupy all of the distance between the two series of balls in the two shells in which peripheral portion are inserted two series of flat headed screws 79 twenty-six in number and arranged to make contact respectively with the two series of balls 27 and 77 on each side thereof and the screws fastened through the peripheral portion of the wheel without contacting with the same there being twenty-six screws on each side of the wheel corresponding in number with the number of balls contacting on each side of the wheel. The inner ends of the screws are screwed into small contact plates 109 extending inwardly from the wheel and carry on their inner ends contact screws 111 which are adapted to clamp to terminals on the ends of wires 113. Terminals 114 on the other ends of said wires are connected to similar screws 111 which are similarly connected by a small contact plate 109 with other contact screws 79 on the opposite sides of the wheel. For convenience in setting up the codes there are thirteen green wires used in one side of the wheel and thirteen red wires on the other side of the wheel, the terminals of both sets of wires are numbered from 1 to 13. In forming a code these wires may be mixed in a practically unlimited manner.

To move the left hand shell 87 a screw nut 117 is turned said nut meshing internally with a thread 116 on the shaft of the left hand shell and to return it to its normal or original position said screw is turned in the reverse direction, the degree of tightness of the shell against the code wheel being regulated by the position of an outer nut 118 which is adjustably screwed upon the outer portion of the shaft 89 and secured in position on said shaft by either one or two set screws 119 screwed in diametrically opposite directions into said outer nut.

The cam wheel 124 has in its periphery four depressions 126 two only being here shown. Into these depressions can enter a wheel 127 carried on an arm 128 pivoted at one end of a shaft 129, which shaft at its other end carries an arm 131 (Figure 3) which extends over spacing lever 132 of the typewriter. A spring 133 normally actuates said arm 128 to move the wheel 127 into said recesses when a recess is brought into position. This arrangement causes the typewriter to automatically space the writing in groups of five letters as the recesses are spaced from each other a distance corresponding to a group of five ratchet teeth. The object of this arrangement is to provide greater convenience in transmitting groups of letters and figures by cablegram and as an additional cause of secrecy.

The cam wheel 124 is normally caused to rotate with the gear wheel 122 by means of plunger 134 which has a pin 136 which is pressed into one of a circular series of holes 137 in the face of the gear wheel 122 and can be withdrawn therefrom by a plunger 139 screwed upon the end of the plunger stem 138 of the plunger 134 so that the pin 136 is drawn out of the hole 137; a head of the plunger 139 being then turned transversely to the groove 141 in which it normally rests. In this position, the cam wheel 124 can be turned freely about the shaft 123 of the gear wheel 122. The main object of having the cam wheel adjustable is in order that it may commence spacing at any other point less than five spaces from the recess.

Figures 17 and 18 are diagrammatical views illustrating transmission of the letters of the key board of the typewriter to the printing type of the typewriter passing thru the wires of the code wheel. The outer row of letters 161, Figs. 17 and 18 illustrating the letters of the key board of the code machine and the inner circle of letters 162 of each figure indicating letters from the type of the typewriting machine. The lines joining the contacts 163 of each figure of said inner and outer lines indicating the wires in the code wheel 59, Figures 13, 14, 15, 16 and 4.

Thus it will be seen that the letter H, 142, shown in the diagram Figure 17 at the key board of the code machine 161 by being electrically connected to the typeletter Y of the inner circle 162 causes the letter Y to be printed by the typewriting machine when the letter H of the code machine is operated, in a like manner it can be seen by the diagram Figure 17 that the operation of the letter H of the code machine will cause the letter Y to be printed and that the operation of the letter Y of the code machine will cause the letter H to be printed, the twenty-six letters of the alphabet being arranged in thirteen pairs makes it possible to spell words in cipher and by copying the cipher words to return them or translate them into their true meaning.

At the same time the operation of the letter H on the code machine causes the letter Y to be printed by the typewriter. The code wheel is advanced one step by the mechanism previously described which movement entirely changes the code or electrical connections between the key board of the code machine and the type of the typewriter as shown diagrammatically in Figure 18 from which it will be seen that a second operation of the letter H on the code machine would now cause the letter O to be printed by the typewriter.

As before this operation of the key of the code machine will cause a further advance of one step of the code wheel again changing the code and so on through twenty-six operations of the letters on the code machine.

With a single code wheel at the twenty-seventh operation the letter H would again be translated into the letter Y and the whole series will be repeated for the next twenty-six operations of the letter H.

Figure 19 shows diagrammatically the wiring system for the operation of a single code wheel which is termed a twenty-six code machine because as above described if the same letter of the key board is operated repeatedly the cipher letters would not repeat in regular order until the twenty-seventh operation.

Such a machine is considered entirely secret but the machine can be constructed as shown diagrammatically in Figure 20 where two extra code wheels are employed making a 676 code machine while the addition of further code wheels would give a still greater number of codes.

Instead of employing two or more wheels simultaneously an unlimited number of changes is possible by substituting code wheels set on different combinations one after the other and repeating the cipher obtained from the first wheel through the second wheel, the cipher thus obtained through a third wheel and so on.

Figures 1, 2:
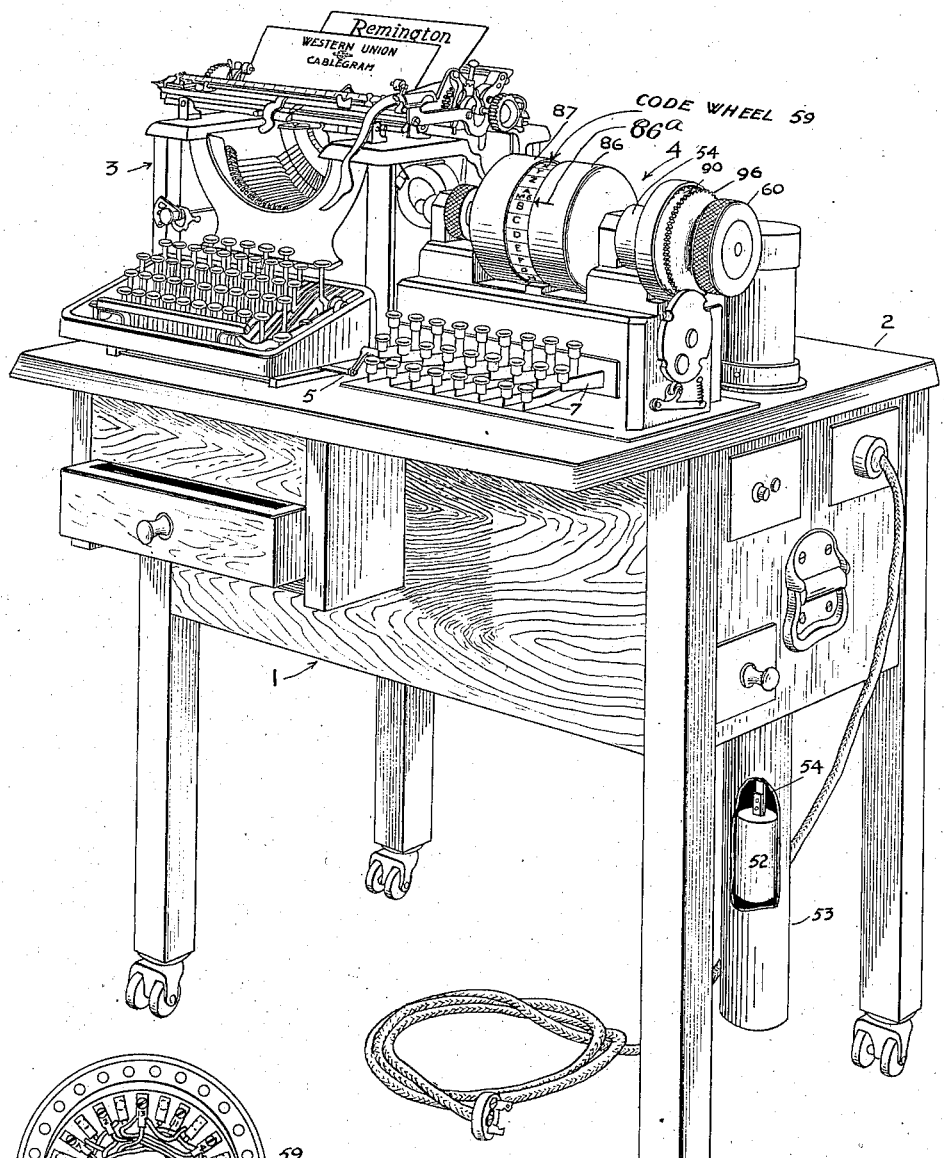
Figure 1 is a perspective view of my improved apparatus as a whole certain small details being omitted.
Figure 2 is a perspective view of the code wheel.
Figure 7:
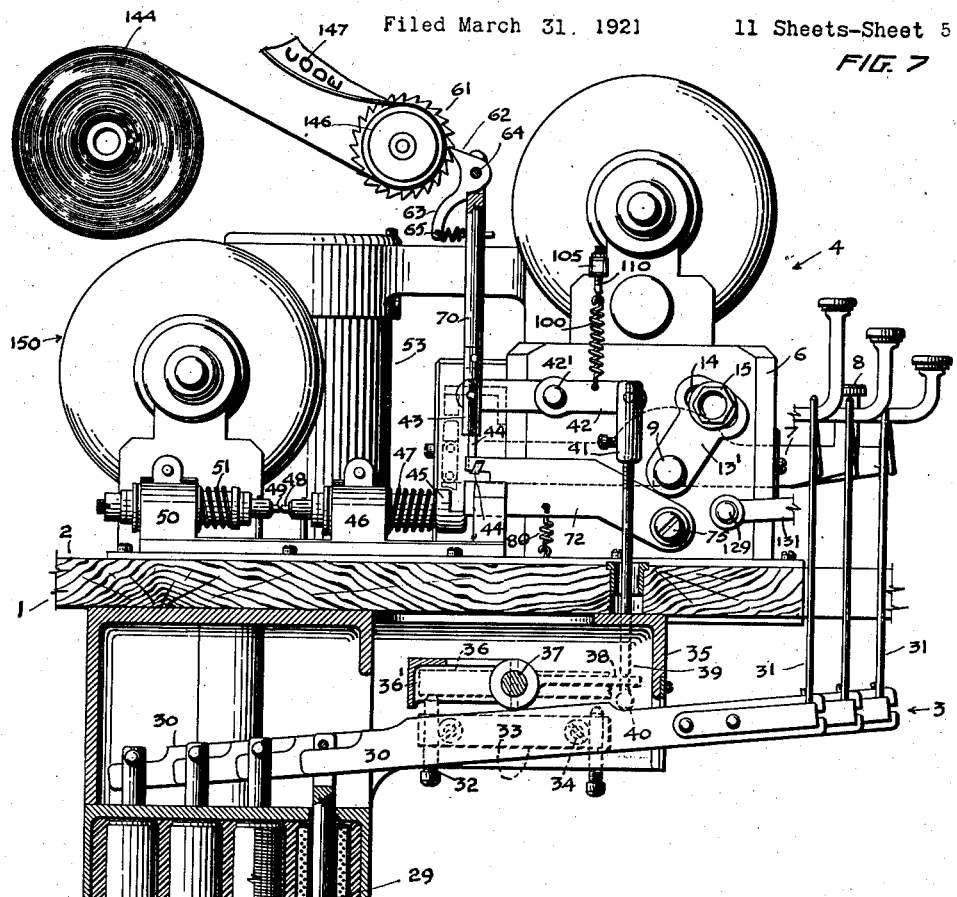

A code wheel will translate the cipher made or will make cipher that can be translated by any other wheel set to the same combination.

Where desired the printing of the characters by the typewriter instead of being effected horizontally on a sheet of paper as usual in typewriters may be effected vertically on a continuous strip of paper by means of the mechanism shown in Figure 7 where a narrow strip of paper from a roll 144 is fed around the roller 146 of the typewriter which roller is operated by the dog 62 pivoted at 64 at the end of a vertical arm 70 which is an extension of the hanger 43.

As previously described at each operation of a key of the code machine the hanger 43 is moved vertically and this movement being transmitted to the extension 70 will cause the dog 62 by its engagement with a ratchet wheel 61 secured to the same shaft as the roller 146 to rotate the roller and therefore spaces the next letter when printed on the tape from that which precedes it. The printing of the characters in this way will therefore be effected in a vertical line as shown at 147.

Figure 24 illustrates the transposition of five messages into plain English code words. The first column gives the message to be sent, the second column gives the code words which will be shown in the code book as being the code for the message while the third column shows the English words which are sent.

These words are obtained by setting the sender's code wheel so that the first letter of the word in the code book is opposite the register mark 86ª on the right hand shell 86, for instance in the case of the first code word T, P, N, I, the code wheel is set so that the letter T is opposite the register mark. The keys on the code machine marked with remaining three letters namely, P. N. I. are then operated and the typewriter will type the word "the," the code book and connections of the code wheel for use therewith being mutually adapted to this end. Similarly for the remaining code words the code wheel will in each case be set to the first letter of the word and the three remaining letters when operated on the code machine will give the English words shown in column 3.

The party receiving the message would receive the English word sent, for instance the English word "the" as shown in the first example in Figure 24. The code wheel of the receiver's machine would be set with the letter T on its periphery opposite the register mark 86ª on the right hand shell 86. The letters T, H, E, would then be operated on the code machine and the typewriter would print the letters P, N, I. The receiver would then place the letter T, which is the first letter of the received word, in front of the code letters P, N, I, and will look up in his code book this four letter code T, P, N, I and translate it into the sentence, "send money." The other words would be similarly decoded.

As the code wheel of the code machine is a small and easily carried article my invention provides a changeable hand code device that can be readily carried concealed upon the person and applicable for use wherever one of my code machines is available.

I claim:—

1. A coding and decoding machine comprising a plurality of circular series of stationary contacts arranged in the same fortuitous order, a circuit changing device including a movable member and contacts arranged on the opposite sides of and movable with said member, a plurality of coding keys, and electrically operated printing key actuating means controlled by said coding keys and including the first and second mentioned contacts, the contacts on one side of said movable member being connected with the contacts on the opposite side thereof in complementary pairs so that the operation of a coding key causes the printing of a certain letter through the printing key actuating means while, with the movable contacts in the same position, the operation of a coding key corresponding to the letter so printed will cause the printing of the letter of the first mentioned key.

2. A coding and decoding machine comprising a plurality of coding keys, circuit closing devices operated by said keys, electrically operated printing key operating means, an electric circuit including said circuit closing devices and said key operating means, a circuit controller interposed in said circuit operable by any of said coding keys whereby the circuit controller is moved to circuit closing position in advance of the circuit closing movement of the circuit closing devices, and means operating in response to the movement of the printing key operating means to effect movement of the circuit controller to circuit opening position in advance of the circuit opening movement of the circuit closers whereby sparking produced incident to opening and closing of the circuit is localized at the circuit controller.

3. A coding and decoding machine comprising a plurality of circular series of stationary contacts arranged in the same fortuitous order, a circuit changing device including a movable member and contacts arranged on the opposite sides of and movable with said member, a plurality of coding keys, electrically operated printing keys actuated means controlled by said coding keys and including the first and second mentioned contacts, the contacts on one side of said movable member being connected with the contacts on the opposite side thereof in complementary pairs so that the operation of a coding key causes the printing of a certain letter through the printing key actuating means while, with the movable contacts in the same position, the operation of a coding key corresponding to the letter so printed will cause the printing of the letter of the first mentioned key, and a coding key actuated main circuit controller automatically moved to circuit opening position coincident with the operation of the electrically operated printing key actuating means and adapted to localize sparking incident to the operation of said coding keys.

4. A coding and decoding machine comprising a plurality of coding keys, circuit closing devices operated by said keys, electrically operated printing key operating means, an electric circuit including said circuit closing devices and said key operating means, said circuit including a plurality of circular series of stationary contacts arranged in the same fortuitous order, corresponding series of movable contacts, the movable contacts of their respective series being connected in complementary pairs so that the operation of a coding key causes the printing of a certain letter through the printing key actuating means while, with the movable contacts in the same position, the operation of a coding key corresponding to the letter so printed will cause the printing of the letter of the first operated key, a circuit controller interposed in said circuit operable by any of said coding keys whereby the circuit controller is moved to circuit closing position in advance of the circuit closing movement of the circuit closing devices, and means operating in response to the movement of the printing key operating means to effect movement of the circuit controller to circuit opening position in advance of the circuit opening movement of the circuit closers whereby sparking produced incident to opening and closing of the circuit is localized at the circuit controller.

5. A coding and decoding machine comprising a plurality of keys, circuit closing devices operated by said keys, electrically operated printing key operating means, and an electric circuit including the circuit closing devices and the printing key operating means, a movable circuit changer interposed in said circuit between the circuit closing devices and the printing key operating means, and means operated in response to an operation of the printing key operating means to effect movement of the circuit changer incident to each operation of the printing key operating means.

6. A coding and decoding machine comprising a plurality of coding keys, circuit closing devices operated by said keys, an electrically operated printing key operating device associatel with each coding key, an electric circuit including said circuit closing devices and said printing key operating means, a circuit changer interposed in said circuit intermediate the circuit closing devices and the printing key operating device, said circuit closing devices including series of relatively stationary and movable contacts, and means operating in response to each actuation of the printing key operating means to effect movement of the relatively movable contacts of the circuit changing device through the distance between two adjacent contacts, the last mentioned means including a rocker member arranged to be operated by any of the key operating devices.

7. A coding and decoding machine comprising a plurality of coding keys, electro-magnetically actuated printing key operating means operable by the coding keys, a movable circuit changing device associated with the electro-magnetic means, and means to effect step by step rotary movement of the circuit changing device in response to repeated operations of the electro-magnetic means.

8. A coding and decoding machine comprising a plurality of coding keys, electro-magnetically actuated printing key operating means operable by the coding keys, a movable circuit changing device associated with the electro-magnetic means, and means to effect step by step rotary movement of the circuit changing device in response to repeated operations of the electro-magnetic means, said last mentioned means including a toothed wheel carried by the circuit changing device, and a detent actuated by the electro-magnetic means, and coacting with said toothed wheel.

9. A coding and decoding machine adapted for use in conjunction with a typewriter comprising a plurality of coding keys, means operated in response to the actuation of said keys for depressing a typewriter key, and automatically actuated means for grouping the letters printed by a typewriter in predetermined numbers.

10. A coding and decoding machine adapted for use in conjunction with a typewriter having printing and spacing keys comprising a plurality of coding keys, means operating in response to actuation of said coding keys to effect operation of the typewriter printing keys, and means associated with the first mentioned means and operating to automatically actuate the typewriter spacing key when a predetermined number of letters have been printed.

11. A coding and decoding machine adapted for use in conjunction with a typewriter having printing and spacing keys comprising a plurality of coding keys, means operating in response to actuation of said coding keys to effect operation of the typewriter printing keys, means associated with the first mentioned means and operating to automatically actuate the typewriter spacing key when a predetermined number of letters have been printed, said last mentioned means including a cam, and a typewriter engaging and operating lever actuated by said cam.

12. A coding and decoding machine comprising a plurality of circular series of stationary contacts arranged in the same fortuitous order, a circuit changing device including a movable member and contacts arranged on the opposite sides of and movable with said member, a plurality of coding keys, electrically operated printing keys actuated means controlled by said coding keys and including the first and second mentioned contacts, the contacts on one side of said movable member being connected with the contacts on the opposite side thereof in complementary pairs so that the operation of a coding key causes the printing of a certain letter through the printing key actuating means while, with the movable contacts in the same position, the operation of a coding key corresponding to the letter so printed will cause the printing of the letter of the first mentioned key, and means engageable with the spacing bar of a typewriter for automatically actuating the latter whereby to produce groups of letters of pre-determined number.

13. A coding and decoding machine comprising a plurality of circular series of stationary contacts arranged in the same fortuitous order, a circuit changing device including a movable member and contacts arranged on the opposite sides of and movable with said member, a plurality of coding keys, electrically operated printing keys actuated means controlled by said coding keys and including the first and second mentioned contacts, the contacts on one side of said movable member being connected with the contacts on the opposite side thereof in complementary pairs so that the operation of a coding key causes the printing of a certain letter through the printing key actuating means while, with the movable contacts in the same position, the operation of a coding key corresponding to the letter so printed will cause the printing of the letter of the first mentioned key, the stationary contacts of the circuit changing device including a plurality of spring pressed friction reducing contact balls engageable by the movable contacts.

14. A coding and decoding machine comprising a plurality of coding keys, electrically operated typewriter printing key actuating means operable by said coding keys, an automatically actuated circuit changing device associated with the coding keys, said circuit changing device including a series of movable contacts, and spring pressed contact balls bearing against the movable contacts.

15. A coding and decoding machine comprising a plurality of coding keys, electrically operated typewriter printing key actuating means operable by said coding keys, an automatically actuated circuit changing device associated with the coding keys, said circuit changing device including a series of movable contacts, and spring pressed contact balls bearing against the movable contacts, said movable contacts being removable as a unit from between the series of contact balls.

16. A coding and decoding machine comprising a plurality of coding keys, circuit closing devices operated by said keys, electrically operated printing key operating means, an electric circuit including said circuit closing devices and said key operating means, a circuit controller interposed in said circuit operable by any of said coding keys whereby the circuit controller is moved to circuit closing position in advance of the circuit closing movement of the circuit closing devices, and means operating in response to the movement of the printing key operating means to effect movement of the circuit controller to circuit opening position in advance of the circuit opening movement of the circuit closers whereby sparking produced incident to opening and closing of the circuit is localized at the circuit controller, said circuit controller including a pair of relatively movable contact members, one of said contacts being actuated in one direction incident to the depression of a coding key and being actuated in the opposite direction incident to movement of the printing key operating means.

17. A coding and decoding machine comprising a plurality of coding keys, circuit closing devices operated by said keys, electrically operated printing key operating means, an electric circuit including said circuit closing devices and said key operating means, a circuit controller interposed in said circuit operable by any of said coding keys whereby the circuit controller is moved to circuit closing position in advance of the circuit closing movement of the circuit closing devices, and means operating in response to the movement of the printing key operating means to effect movement of the circuit controller to circuit opening position in advance of the circuit opening movement of the circuit closers whereby sparking produced incident to opening and closing of the circuit is localized at the circuit controller, the circuit controller including a pair of spring actuated contact members, one of said contact members being separated from the other through the movement of any printing key actuating means and being brought into contact with the other contact member incident to the depression of a coding key.

18. A coding and decoding machine comprising a plurality of coding keys, electrically operated printing-key operating means, an electric circuit including said printing key operating means, a circuit controller interposed in said circuit, means actuated in response to an operation of a coding key to move said circuit controller to circuit closing position, and means acting in response to an operation of the printing key operating means to effect the opening movement of said circuit controller.

19. A coding and decoding machine comprising a plurality of coding keys, electrically operated printing key operating means, an electric circuit including said printing key operating means, a normally opened circuit controller interposed in said circuit, displaceable means operating in response to an operation of a coding key to move said circuit controller to circuit closing position, and means acting in response to an operation of the printing key operating means to move said displaceable means to inoperative position and thereby permit the circuit controller to move to circuit opening position.

20. A coding and decoding machine comprising a plurality of coding keys, electrically operated printing key operating means, an electric circuit including said printing key operating means, a normally opened circuit controller interposed in said circuit, displaceable means operating in response to an operation of a coding key to move said circuit controller to circuit closing position, means acting in response to an operation of the printing key operating means to move said displaceable means to inoperative position and thereby permit the circuit controller to move to circuit opening position, and means for restoring said displaceable means to operative position subsequent to the opening of the circuit.

21. A coding and decoding machine comprising a plurality of coding keys, electrically operated printing key operating means, an electric circuit including said key operating means, a normally open circuit controller interposed in said circuit and movable to circuit closing position by any of said coding keys, a member operated in response to an actuation of the printing key operating means, means connecting said member with said circuit controller whereby the latter is restored to circuit opening position subsequent to an actuation of the printing key operating means, and letter grouping means also actuated by said member.

EDWARD H. HEBERN.